May 13, 1930. J. S. WOODHOUSE 1,758,210
TIRE CHAIN CONNECTER
Filed Nov. 3, 1928
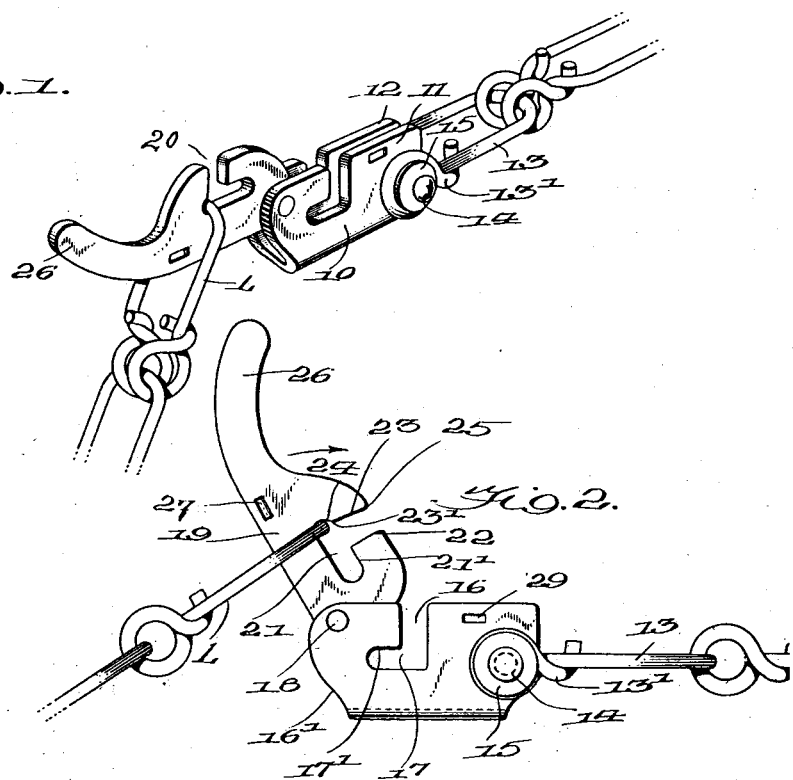
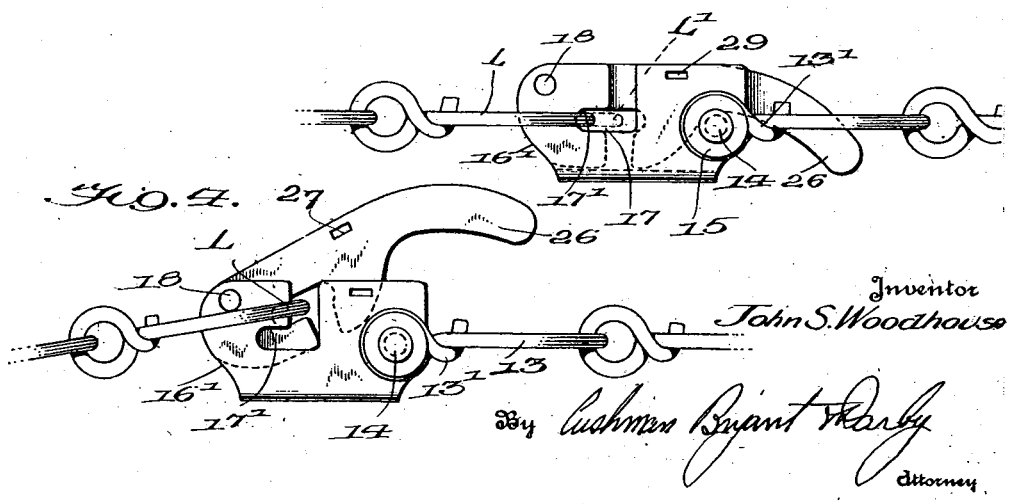

Patented May 13, 1930

1,758,210

UNITED STATES PATENT OFFICE

JOHN S. WOODHOUSE, OF TROY, NEW YORK, ASSIGNOR TO CARR CHAIN WORKS, INC., OF TROY, NEW YORK, A CORPORATION OF NEW YORK

TIRE-CHAIN CONNECTER

Application filed November 3, 1928. Serial No. 317,030.

The present invention relates to tire chain connecters of the lever type. This type of connecter ordinarily comprises a body member to which a link of the chain is permanently connected and a lever pivoted to the body member and adapted to receive in a slot therein a free link of the chain to carry the same into a complemental slot formed in the body member when the lever is moved into interlocking relation with the body member.

An object of the invention is to provide a connecter of this type which when closed securely holds the free end of the chain in connected relation to the end which is permanently secured to the body member and which, because of its construction, will not tend to open under the stresses and strains set up during use.

A further object of the invention is to provide a connecter of this type which the tautness of the chain holds in closed or locked position and in which there is practically only one position of the free end of the chain which will permit the lever to open, said position being such that the chain will not tend to assume the same, but must be intentionally manipulated for this purpose.

The foregoing and other objects of the invention more closely related to details of construction of a preferred embodiment illustrated in the accompanying drawings will become apparent as the description proceeds.

In the drawings

Figure 1 is a perspective showing the connecter in opened position with the free end of the chain engaged with the lever.

Figure 2 is a side elevational view showing an intermediate position of the lever as the connecter is being closed.

Figure 3 is a side elevational view showing the lever and body member in interlocked relation, and Figure 4 is a side elevational view showing an intermediate position of the lever as the same is being opened to release the free end of the chain.

Referring to the drawings for a more detailed description, the body member 10 comprises side walls 11, 12 formed of a single piece of metal bent to the form illustrated. To one end of the body member is connected a link 13, as by means of a pin 14 extending through the walls 11 and 12 and having projecting ends about which the ends 13' of the link are coiled. A washer 15 disposed between each head of the pin and the coil of the link prevents the separation of the link from the pin.

Each wall of the body member has a substantially L-shaped slot, an inlet and outlet portion 16 of which extends downwardly from the free edge of the wall to one end of a cove portion 17. The cove portion extends longitudinally of the body member toward the end 16' of the same which has a pivot 18 preferably in the upper corner thereof for a lever 19 disposed on the pivot between the two walls of the body member. The lever has an L-shaped slot with an inlet and outlet portion 20 communicating with one end of a longitudinally extending cove portion 21 which extends from the inlet and outlet portion toward the lever end having the pivot 18.

The wall 22 of the inlet and outlet portion is straight, but the wall 23 which is more remote from the lever pivot is inclined toward the wall 22 in the direction away from the cove portion 21, and the wall 23 at its lower end 23' where it communicates with the cove portion 21 is undercut to provide a relatively shallow seat 24. As will be observed, this seat merges into the wall 23 which, when the free link L of the chain is slipped over the relatively sharp shoulder 25, serves to slide the chain because of the wall inclination downwardly into the seat 24. This seat being in depth approximately the diameter of the chain serves effectively to retain the chain within the cove portion during the initial movement of the lever to the position illustrated in Figure 2. The inclination of the wall 23 assists in resisting any movement of the chain from the seat 24 and as the lever is carried to locked position the chain will be guided into the inlet portions 16 of the body member slots. The inclination of the wall 23 not only serves to guide the chain into the seat 24 and to resist movement therefrom but also functions to facilitate opening of the connecter as will be later described.

The lever is provided with a curved finger piece 26 which may be manually engaged to open and close the connecter. This finger piece, when the connecter parts are in locked position, projects into the link 13, as illustrated in Figure 3, and thus is protected by the chain link against any accidental engagement which would tend to open the connecter.

With the parts in the locked position illustrated in Figure 3 and the chain taut, the connecter cannot be opened until the link L is moved from the position illustrated in full line to the dotted line position L' in which the end of the link is in registry with the inlet and outlet portions 16 of the body member slots and with the inlet and outlet portion 20 of the lever slot. Any attempt to open the lever, unless the link is moved to this position, will cause the edge 21' of the cove portion in the lever to engage the link, which will be gripped between the same and the edges 17' of the body member cove portions. Consequently, it is necessary to manipulate the link L very accurately to the dotted line position L' before the device can be opened. The wider inner end of the inlet and outlet portion 20 of the lever slot facilitates opening of the lever when the link L is manipulated to the dotted line position L', since if the inlet and outlet portion 20 were of the same width at its inner end as at its outer end, it would be difficult to open the link, unless the outer end were of substantially greater width than the diameter of the chain material. However, it is desirable that the inlet and outlet portion of each slot at the edges of the lever of the body member be relatively narrow, as illustrated, and this is possible due to the widening of the inner end of the lever slot portion 20 as described.

If desired, the lever and body member may have interlocking means such as the depression 27 on the lever adapted to receive the projections formed on the inner faces of the body member side walls by stamping the material inwardly as indicated at 29.

In the operation of the connecter the free chain link L is positioned in the seat 24, as indicated in Figure 1, and thereafter by engagement with the finger piece 26 the lever is closed down between the walls of the body member whereupon the chain link L being taut takes the position illustrated in full lines.

To open the connecter, the link L is moved to the dotted line position L' whereupon the lever may be lifted by pressure exerted upon the finger piece 26. As will be noted, the inlet and outlet portions 16 and 20 of the body-member and lever, respectively, extend inwardly from opposite edges of the lever and body member, and each communicate with the ends of the cove portions 17 and 21 which are remote from the lever pivot 18. These cove portions extend from the inlet and outlet portions toward the end of the lever and body member respectively, which have the lever pivot. Moreover, since the cove portions are disposed below the longitudinal plane of the lever pivot as illustrated in Figure 3, any longitudinal strain upon the chain is taken up by the end of the cove portion in the body member, and is not exerted upon the pivot 18.

What I claim is:

A tire chain fastener comprising a body member having spaced side walls and connected at one end to a chain link, a lever having an end thereof pivoted at the other end of the body member and between its walls, said lever being adapted to close down between said walls, a finger piece on said lever adapted to project into said link when the lever is closed, an L-shaped slot in said lever having a cove portion extending longitudinally of the lever and an inlet and outlet portion communicating with said cove portion at the end thereof remote from the lever pivot and directed inwardly from an edge of the lever, the lower end of the wall of said inlet and outlet portion which is more remote from the lever pivot being undercut to form a relatively shallow chain seat which receives and holds the chain during initial closing movement of the lever, and a complemental L-shaped slot in each of the body-member walls, each slot having an inlet and outlet portion extending inwardly from the opposite edge of the wall from the edge of the lever having said inlet and outlet slot and a longitudinally extending cove portion below the longitudinal plane of the lever pivot, said inlet and outlet portions of the body member communicating with the cove portions at the ends thereof remote from the lever pivot, said chain when the parts are in their closed position being prevented from removal until the chain is moved out of the cove of the body member and is brought into alignment with said inlet and outlet portions of both the lever and body member during said removal.

In testimony whereof I have hereunto set my hand.

JOHN S. WOODHOUSE.